(No Model.)  7 Sheets—Sheet 1.

J. CASEY.
BOX NAILING MACHINE.

No. 431,964. Patented July 8, 1890.

WITNESSES
N. L. Harris
H. F. Ashton

INVENTOR
J. Casey
by E. W. Anderson,
Attorney

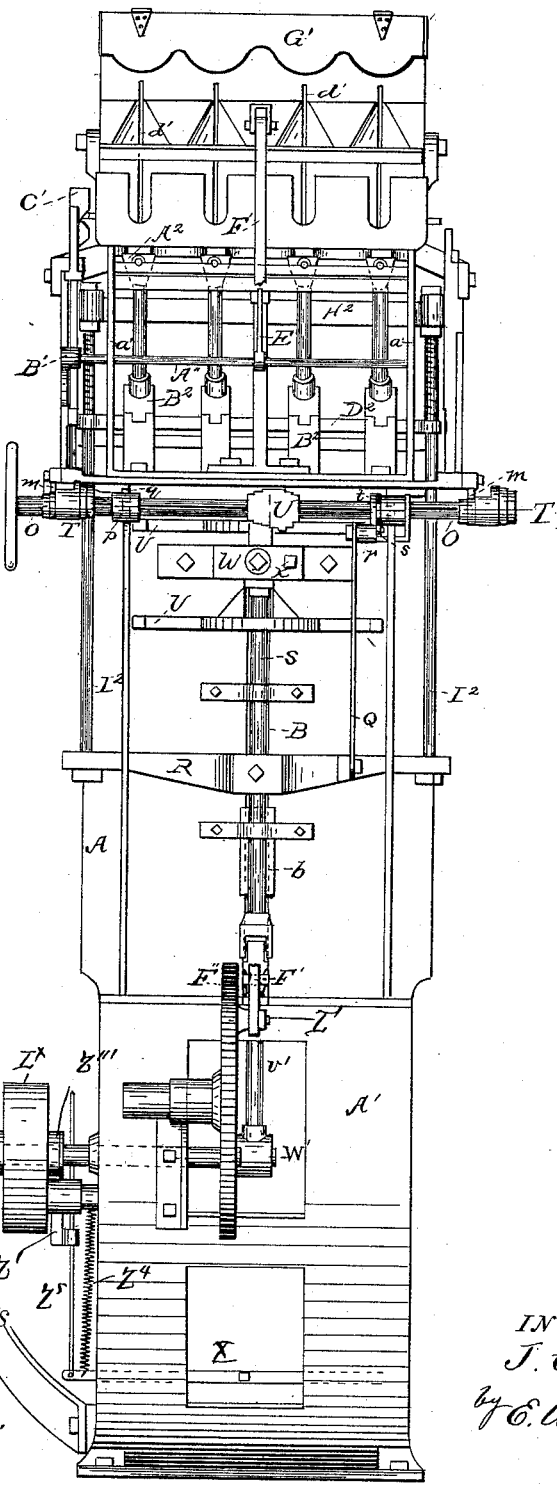

(No Model.)  7 Sheets—Sheet 3.
J. CASEY.
BOX NAILING MACHINE.
No. 431,964.   Patented July 8, 1890.
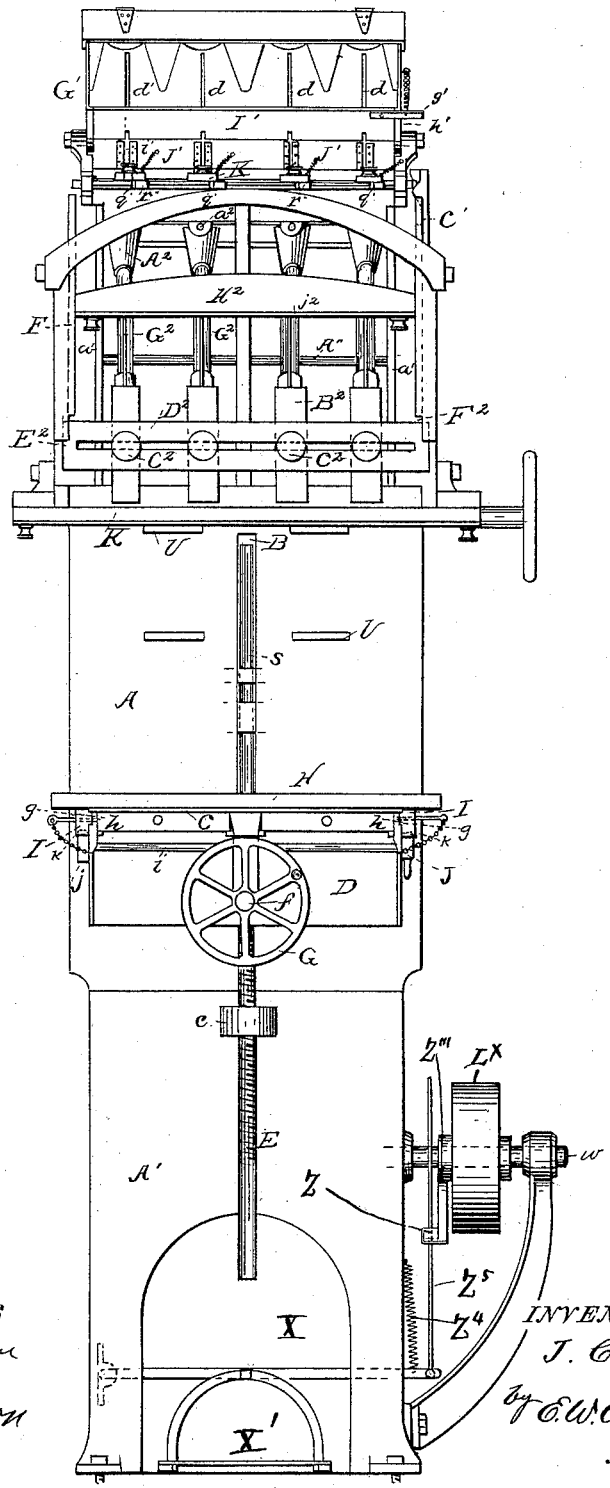
WITNESSES
H. J. Ashton
Villette Anderson
INVENTOR
J. Casey,
by E. W. Anderson,
Attorney (No Model.)  7 Sheets—Sheet 4.
J. CASEY.
BOX NAILING MACHINE.
No. 431,964.  Patented July 8, 1890.
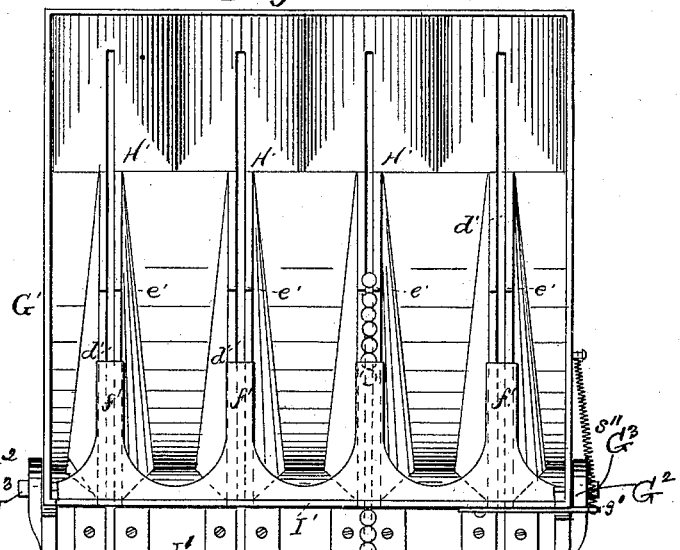
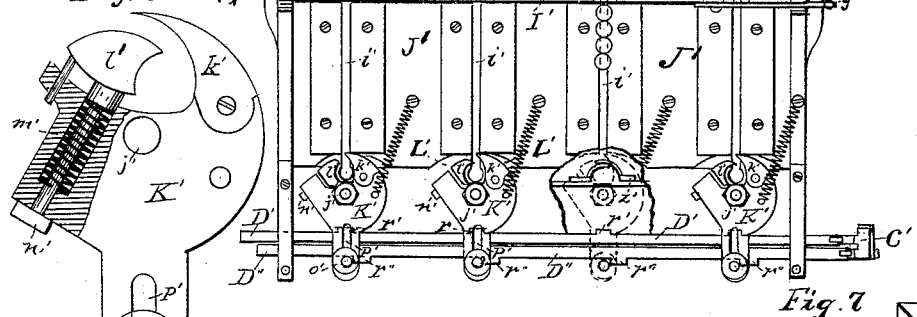
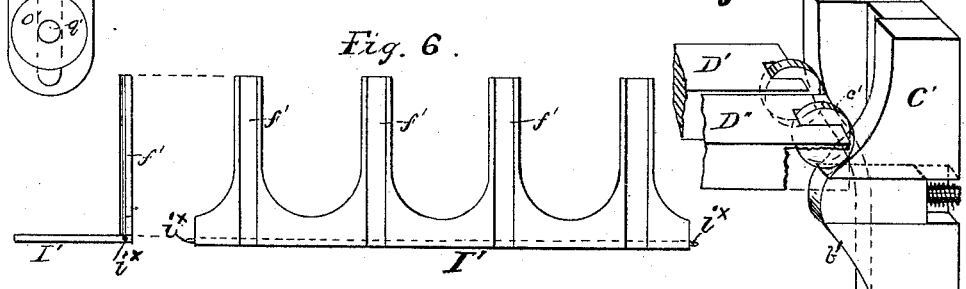
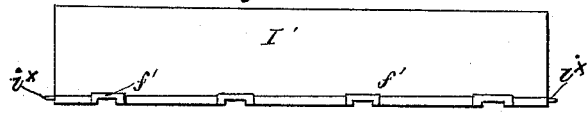
WITNESSES
H. F. Ashton,
Villette Anderson.
INVENTOR
J. Casey,
by E. W. Anderson,
Attorney (No Model.) 7 Sheets—Sheet 5.
J. CASEY.
BOX NAILING MACHINE.
No. 431,964. Patented July 8, 1890.
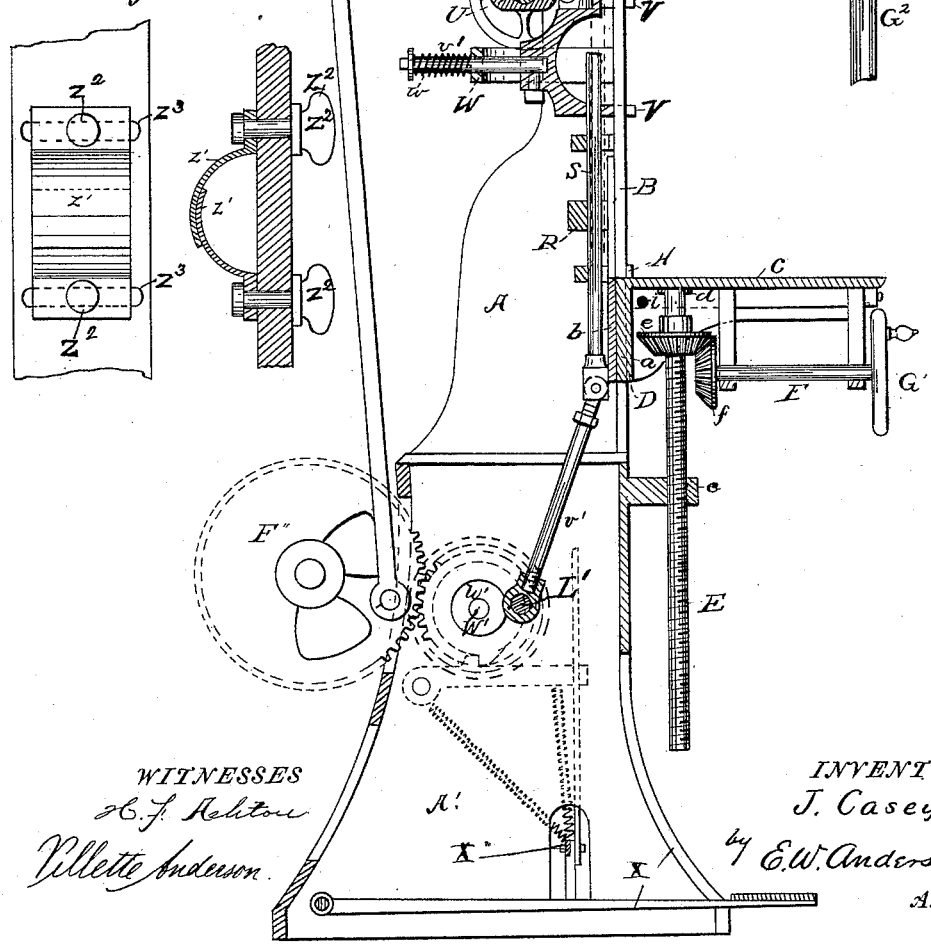

(No Model.) 7 Sheets—Sheet 6.
J. CASEY
BOX NAILING MACHINE.
No. 431,964. Patented July 8, 1890.
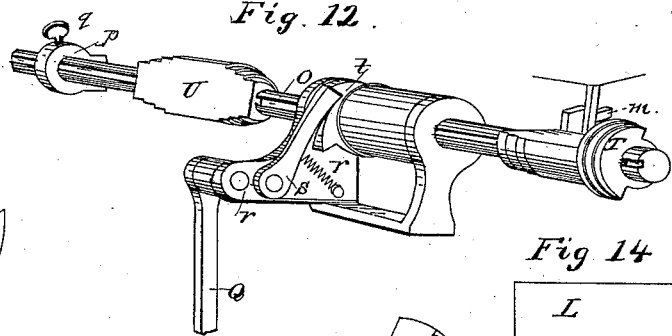
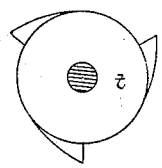
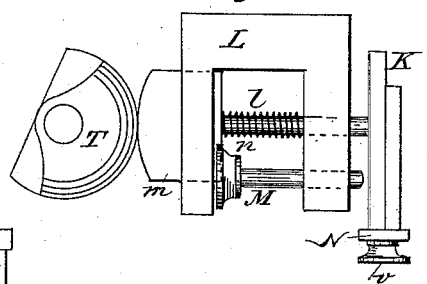
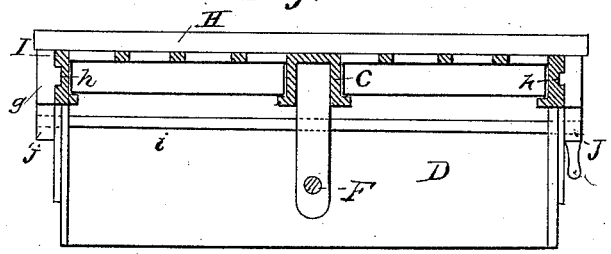
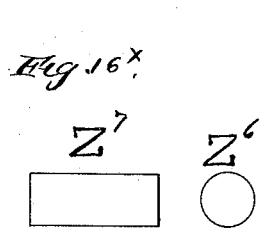
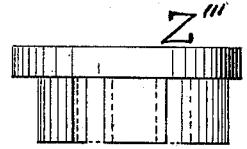
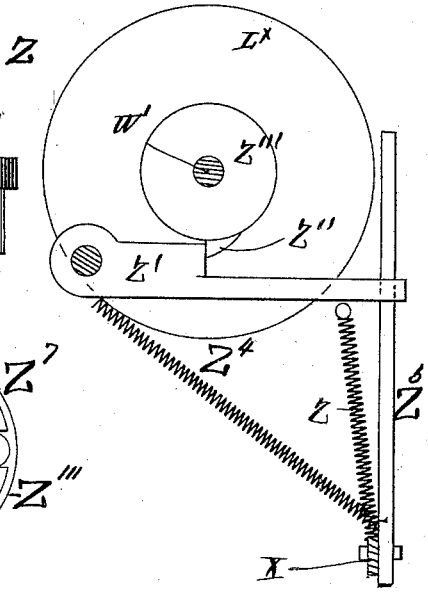
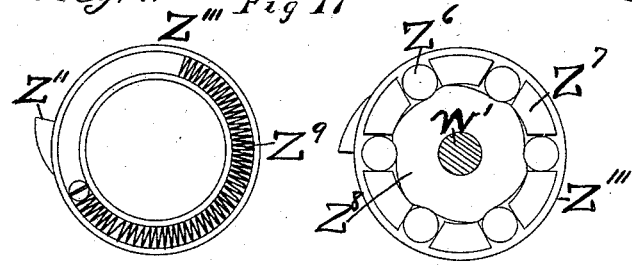
WITNESSES
H. F. Ashton.
Villette Anderson.
INVENTOR
J. Casey,
by E. W. Anderson,
Attorney (No Model.) 7 Sheets—Sheet 7.

J. CASEY.
BOX NAILING MACHINE.

No. 431,964. Patented July 8, 1890.

WITNESSES
M. F. Ashton
Villette Anderson

INVENTOR
J. Casey
by E. W. Anderson
Attorney

UNITED STATES PATENT OFFICE.

JEREMIAH CASEY, OF EDGEWATER, NEW JERSEY, ASSIGNOR TO THE CASEY MACHINE AND SUPPLY COMPANY, OF NEW YORK, N. Y.

BOX-NAILING MACHINE.

SPECIFICATION forming part of Letters Patent No. 431,964, dated July 8, 1890.

Application filed January 26, 1889. Serial No. 297,733. (No model.)

*To all whom it may concern:*

Be it known that I, JEREMIAH CASEY, a citizen of the United States, and a resident of Edgewater, in the county of Bergen and State of New Jersey, have invented certain new and useful Improvements in Box-Nailing Machines; and I do declare the following to be a full, clear, and exact description of the invention, such as will enable others skilled in the art to which it appertains to make and use the same, reference being had to the accompanying drawings, and to letters of reference marked thereon, which form a part of this specification.

Figures 1, 24, 25, 26:
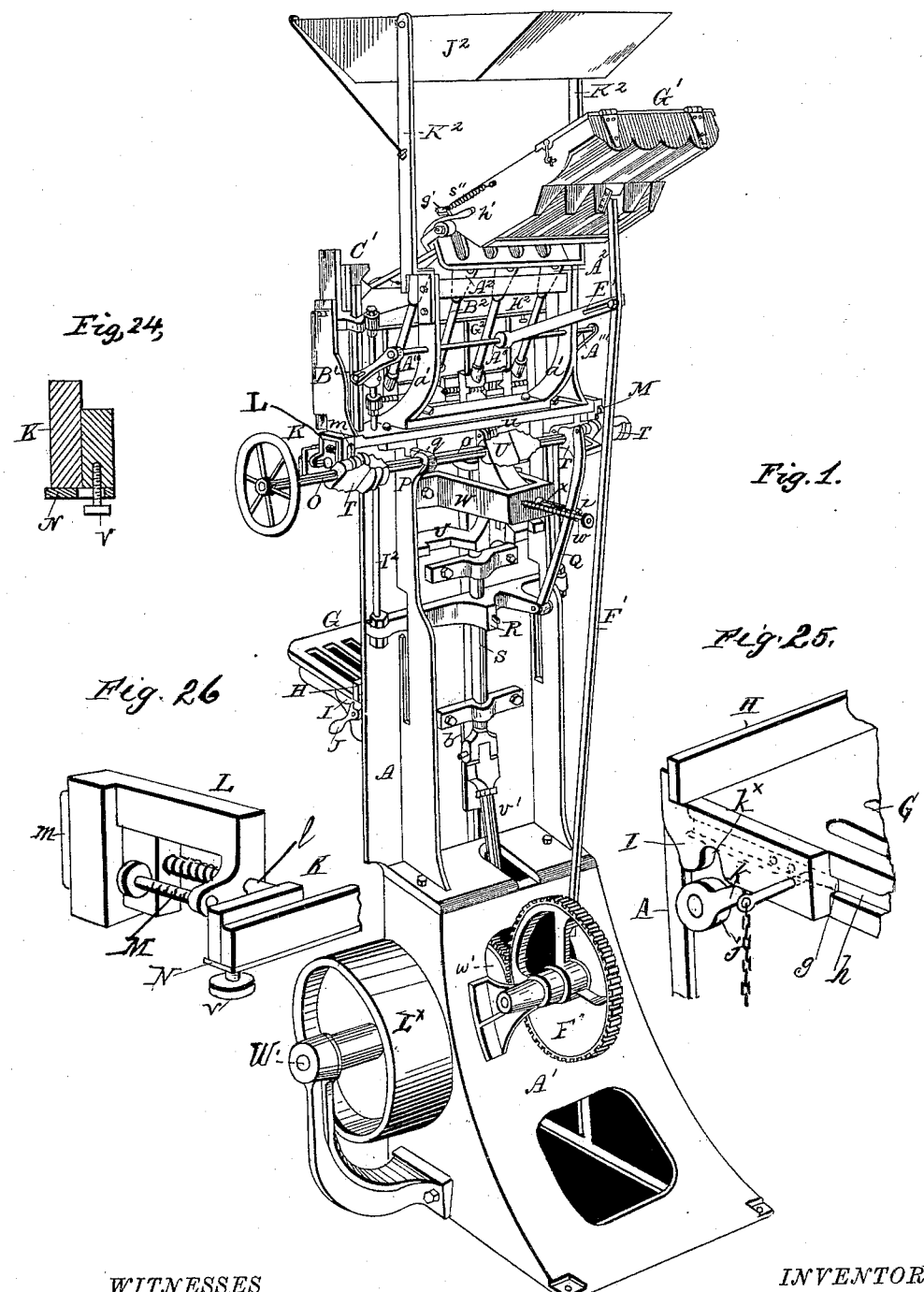
Figure 18:
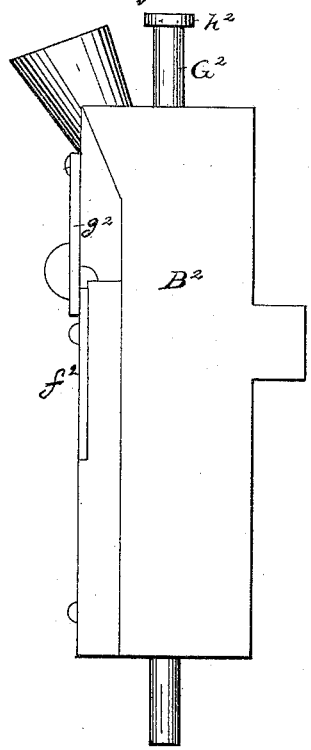
Figure 19:
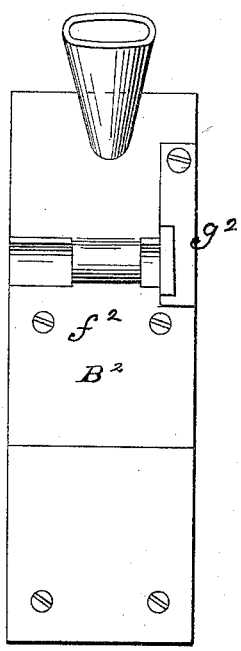

Figure 1 of the drawings is a representation of a perspective view illustrating the invention. Fig. 2 is a rear view of the machine. Fig. 3 is a front view of the same. Fig. 4 is a top view of the nail hopper and pickers. Fig. 5 is a detail view of a picker. Fig. 6 is a similar view more particularly of the fingers on the front of the nail-box. Fig. 7 is a detail perspective view of the picker-plates and their actuating-cams. Fig. 8 is an inner edge view of the finger-carrying front. Fig. 9 is a vertical section of the machine. Fig. 10 is an enlarged cross-sectional view of the cross-head and of the drivers in side view and partly broken off. Fig. 11 is a detail view of one of the chute-guides. Fig. 12 is a detail perspective view of the stepped or conical pulley and adjunctive parts. Fig. 13 is a detail view of a ratchet. Fig. 14 is a detail view of a hanger, adjustable step-cam, and adjunctive parts. Fig. 15 is a detail transverse sectional view of lower gage for the machine-table. Figs. 16, 16×, 16××, 17, and 17× are detail views of a certain clutch mechanism. Figs. 18, 19, 20, 21, 22, and 23 are detail views of the nail-chucks. Fig. 24 is a detail sectional view showing more fully the adjustable connection between the gage K and plate N. Fig. 25 is a similar view disclosing more fully the notched plate and its engaging projection, and Fig. 26 is also a detail view showing more fully the connection between and relative position of gage K and plate N.

This invention relates to improvements in box-nailing machines; and it consists in the construction and novel combination of parts, as hereinafter set forth.

Referring to the drawings, A designates the frame having its vertical front wall slotted centrally, as at B, and A' is the hollow bed-frame.

C is a forwardly-projecting table having a downwardly-turned bearing-flange D at its rear edge, which lies against the vertical front of the frame. A transverse rib $a$, integral with the flange D, projects through and moves in the slot B, and a plate $b$, screwed to said rib, has its edges projecting laterally beyond the slot in the rear, and serves to steady the table.

The table is adjusted vertically by means of the screw E, which engages a threaded opening through the lug $c$ on the bed-frame, and has its upper end seated in the cup-bearing $d$ on the bottom of the table. A bevel-gear $e$ on the screw E meshes with a bevel-gear $f$ on the horizontal shaft F, which is journaled in hangers depending from the table, and has the operating-wheel G on its outer end.

H is the lower gage, extending across the face of the machine on the upper side of the table, and is to gage the work to the driven nails, its adjustability (effected as hereinafter described) permitting the sliding thereof to and from the work. Cheek-plates I on each end of the gage H have a longitudinal rib $g$, adapted to slide in the grooves $h$, formed in the sides of the table, and the said gage is adjustable by means of the short lever J on one side of the table. The said lever J is rigidly secured to one end of the transverse rod $i$, which is journaled through the sides of the table, and has at the end opposite that engaged by the hand-lever a rigid collar $j$, provided with a projection $k$ to engage the notch $k^\times$ in the cheek-plate. A similar projection on the lever J engages a notch in the cheek-plate at the opposite side. By operating the lever J the gage may be moved backward or forward and held as adjusted by pins passing through the cheek-plates and into one of the series of openings in the side of the table.

K is the upper gage-bar, extending across the face of the frame near its upper end below the drivers, hereinafter described, to gage the work to the nails. The gage K is held in position by the integral bolts $l$, Fig. 14, which extend at right angles therefrom near each end through bearings in the hangers L, secured to the sides of the frame by bolts. The bolts $l$ at their outer ends are provided with a wide bearing-head $m$, which moves in a slot opening through the rear depending arm of the hangers L, and a coiled spring $n$ surrounds the slot between the head and the front arm of the hanger. Said springs are designed to return the gage when released by the operating-cams. Thumb-screws M, passing through threaded openings in the front arm of the hangers L, are designed to limit or regulate the rearward movement of the gage.

To increase the bearing-width of the gage K, the plate N is provided at its lower edge and is adjustably connected thereto by the screws $v$.

O, Fig. 12, is a transverse shaft having bearings in the boxes $p$, which extend rearwardly from the frame, and a thumb-screw $q$ is provided, in connection with one of said boxes, which acts after the fashion of a brake upon said shaft in order to regulate its movement. The shaft O is operated to give a fractional revolution thereto by means of the link Q, Figs. 1 and 2, pivoted at its lower end to the cross-head R, adjustably connected by a screw-bolt to the vertical shaft S, which is reciprocated by the gear $w'$ on the main driving-shaft W' through the pitman $v'$. The upper end of the link Q is pivoted to the bracket $r$ on the shaft O, (see Fig. 12,) which carries the pivoted dog $s$, engaging with the ratchet $t$, secured on the said shaft O.

T represents step-cams on the shaft O, adjustable by rib-and-slot connection for operating the gage-plate K by striking against the bearing-heads $m$ at every revolution of the shaft. The adjustability of the gage K is, as above intimated, to regulate the bearing-width of said gage upon the work or box, and that of the step T is to bring any one of its steps in position to act upon the heads.

U is a step-cam, also adjustably secured by rib-and-slot connection to the shaft O near its center, designed to force the gages V, Fig. 9, through the openings in the face plate by engaging against the roller $u$, journaled in the frame of the gages V. The purpose of the gages V is to regulate the thickness of the boards of the boxes, as will more fully appear farther on. A coiled spring $v'$ on the bolt $w$, extending from the gage-frame through an opening in the frame W, serves to return the gages when released by the cam, and a set-bolt $x$ (see Fig. 1) is provided to regulate the return movement of the gages.

The cams above referred to are provided with steps or lifts, so that they may be regulated to project the gages, as desired, for the thickness of the boards of a box.

A'' is a cross-bar journaled through the arms $a'$, and having the arm B' connecting with the vertically-reciprocating cam-plates C', which have bearings in the frame, and are designed to operate the two picker-bars D' D'', Fig. 4. One of said cam-plates C' is provided with a double cam-face $b'$, so that the bar D'' is operated at each movement of the cam, and the other cam-plate is provided with a single face $c'$, so that its picker D' is operated only at the downstroke, whereby an alternating action of the picker-bars is secured, effecting a successive feeding action of the nails from the box. The said cam-plates are operated from the driving-gear by means of the arm E', which is rigidly connected at one end to the bar A'' and pivotally connected at its other end to the rod F', which has a pivotal connection with the driving-gear F'' and oscillates the feed-box G'. The feed-box G' is pivotally connected to the frame at its upper end by arms $G^2 G^2$, projecting from the frame and receiving studs or pivots $G^3 G^3$ on the box, in order to permit of its vibration to shift the position of and direct the nails into the feeding-slots in the bottom of the box, and is divided into trays or stalls H', and between adjacent trays the box G' is provided with slot-openings $d'$, through which the nails project and are fed to the pickers. The slots $d'$ near the lower end have the offset or shoulder $e'$, Fig. 4, designed to retain or hold a series of nails in the slots when the box is at its extreme downward pitch. The front I' of the box is hinged by pintles or projections $i^x i^x$, projecting from the ends of the front I' and entering the ends of the apertures (not shown) in the lower front edges of the box to actuate the fingers of said front, as presently described. The front I' is provided with inwardly-projecting fingers $f'$, which normally lie upon the lower end of each slot, and at the extreme downward pitch of the box $j$ a laterally-projecting lug $g'$, Figs. 3 and 4, on the front I' strikes against the trip $h'$, Fig. 1, and by turning the front on its pivots raises the fingers $f'$ from the slots, allowing the release of any nails that may become clogged in or rest crosswise over the slots. A spring $s''$, as shown, returns the hinged front to a closed position on the upward motion of the tray.

An inclined front plate J' has slot-openings $i'$, which register at their upper ends with the slots $d'$, and provide a continuous way for the nails to the pickers K'.

The nail-pickers K', Figs. 4 and 5, which are for feeding the nails to the chutes $A^2$, are journaled on the bolts $j'$, upstanding from the rigid portion of the front plate, and the rigid jaw $k'$ of each picker is preferably removable and made of hardened steel. The jaw $l'$ is provided with a threaded bolt $m'$, which projects through an opening in the picker-head, as shown, and has an adjusting-nut $n'$ on its threaded end, and a coiled spring on said bolt $m'$ allows the jaw to give slightly when picking the nail.

The picker-head and fixed jaw have a curved form, so as to move in the concave notches L' in the inclined plate when operated by the cams C', and the picker-bars D' D" actuated by the arm B' of the bar A. A thumb-screw o' is adjustable in the slot p' in the extension of the picker-head and engages the internally-threaded lug q', so as to shift the latter into engagement with the lugs r or r', to thus permit of the actuation of either of the picker-bars. A coiled spring, secured to the frame and picker, returns the picker when released by the picker-bars.

As the nail is picked, it is dropped through the funnel-mouthed chute $A^2$ into the chucks $B^2$, which are adjustably secured by means of the thumb-screws $C^2$, which pass through a slot in the transverse bar $D^2$, Fig. 3, secured at its ends to the blocks $E^2$, which are vertically adjustable in the guideways F.

Figure 20:
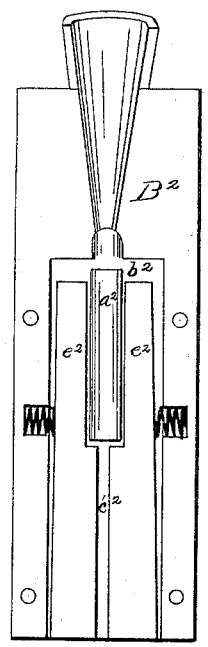
Figure 21:
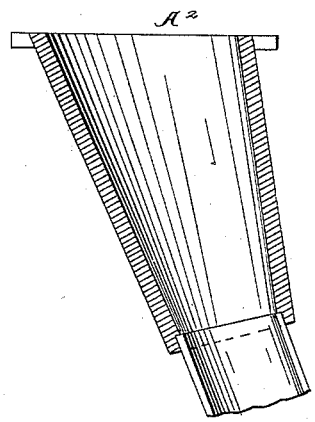
Figure 22:
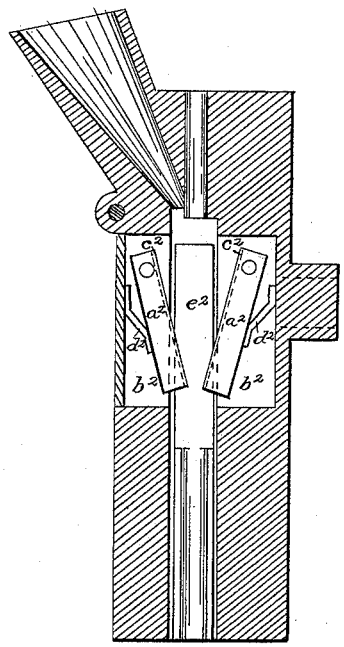
Figure 23:
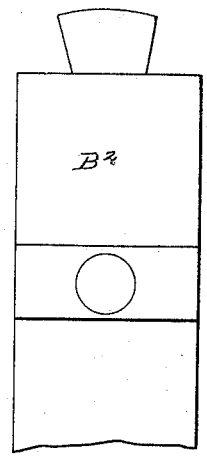

The chucks $B^2$, Figs. 20 and 22, to hold the nails while being driven, consist of the clutch-arms $a^2$, pivoted near their upper ends within the recess $b^2$, and having their adjacent sides at the lower portion grooved or concaved in cross-section, as at $c^2$, through which grooves the drivers $G^2$ force the nail, pressing the arms $a^2$ outward on their pivots against the springs $d^2$, which return the arms to a closed position when the driver is withdrawn. Spring-controlled and grooved pivoted levers $e^2$ bear against opposite sides of the driver, and serve to guide it into the grooves $c^2$.

One side of the chuck-casing is removably secured by screws and has a hinged portion $f^2$, which is held in a closed position by the pivoted keeper $g^2$. This hinged portion is provided so that the chute, which has its end projecting into the chuck, may be easily removed should a nail become clogged therein. Guides $z'$, adjustable to readily accommodate them to the size of the funnel-mouths of the chutes $A^2$, and arranged above said funnel-mouths of the chutes, are provided and are designed to prevent short nails from turning over in their fall into said chute.

The guides $z'$ are rendered adjustable by thumb-bolts $z^2$ connected thereto and passed through slots $z^3$ in the pendent portions of the front plate.

The drivers $G^2$ have the head $h^2$, and are laterally adjustable in the slot $i^2$, formed in the cross-head $H^2$ by the plate $j^2$, (see Fig. 3,) which is rendered removable by securing thumb-screws, so that the drivers may be removed or new ones inserted. The cross-head $H^2$ moves vertically in the guideways F and reciprocates with the cross-head R, being connected thereto by the vertical rods $I^2$.

$J^2$ is a supplemental nail-box, Fig. 1, pivoted between the standards $K^2$, bolted to the frame. The said box $J^2$ is pivoted so that its rear side wall projects over the nail-tray for convenience in dumping nails therein, as required. To prevent the box from tipping accidentally, a suitable catch may be provided or a hook used, as shown.

It will be observed that the machine is operated from the band-wheel $L^x$, the crank L', and gearing $w'$ F" at the base of the machine. The band-wheel is provided with a clutch mechanism, indicated at Z, as Figs. 16 and 17 in the drawings, which consists of a horizontal pawl Z', which engages a tooth Z" on a disk-shaped closure Z''', secured to the shaft W', and which pawl is held in engagement with said disk-tooth Z" by a spring Z. A hand-lever $Z^5$ is adapted to engage with and permit the retraction of the pawl Z' from the tooth Z" of the disk-shaped closure Z''' when it is desired to disengage the clutch from the driving or band pulley shaft. The disk Z''' incloses or contains a series of alternating balls $Z^6$ and concave-faced blocks $Z^7$, bearing upon an irregular-faced supplemental disk or cam $Z^8$, secured to shaft W'. In this disk-shaped closure is also a helical spring $Z^9$, the tension of which holds the said closure in proper position upon the disk $Z^8$.

It will be seen that by the actuation of the treadle X', so as to depress the lever X, the lever $Z^5$ will be moved downward, and thus disengage the pawl Z' from the tooth Z" of the disk Z''', fast to the driving-shaft W', permitting the transmission of the motion of the band-wheel $L^x$ to said disk, in turn putting the said shaft in motion, as desired, to operate the machine. On the other hand, by removing pressure from said treadle the pawl will be again brought into engagement with the tooth of the said disk by the action of the spring $Z^4$, and thus, though the band-wheel is still in motion, yet the shaft will be motionless, the frictional clutch just described permitting the band-wheel to rotate independently thereof, though in contact with said disk. If desired, instead of actuating the treadle, the hand-lever $Z^5$ may be operated directly to effect the disengagement of the pawl Z' from the tooth Z" of the disk Z''' of the driving-shaft W', the lever being automatically returned to its original position when released by the action of the spring Z.

The operation is as follows: The pieces to form the box are temporarily put together and positioned upon the table c, the gages V and K determining that position, and the hopper or box G having the nails is given the required jarring movement to feed the nails therefrom upon the inclined plate J', the hinged nail-conducting front I' of the box G' being raised so as to lift its fingers to permit the passage of the nails in event of clogging from the latter upon said plate J' by the action of the lug g' and the trip h'. The nails passing out upon the plate J' are fed successively, one after the other, in the requisite number of rows two at an operation in the slots $i$ to the pickers K'. The pickers (two) being actuated by one of the cam-plates C', actuated by either one or the other of the bars D' D", conduct the nails to the chutes $A^2$, from which they are passed or fed into the chucks $B^2$, which, by means of the arms $a^2$, hold the nails in position to be driven into the box by means of the drivers G², the cross-head H carrying which being actuated by the reciprocating cross-head R. After the nailing of one edge or end of the box to the ends or edges of the connecting-pieces, the work is then so disposed as to present another end or edge upward to undergo a like nailing operation, the piece to be secured being put in position thereon, and the required pickers K′ brought into requisition in the manner already pointed out, the aforesaid operation being continued until the nailing of the box is completed.

Having described my invention, what I claim is—

1. In a box-nailing machine, the combination, with the frame and the adjustable table, of the gage H, having the notched cheek-plates provided with a rib, the lever J, having the projection, the transverse rod $i$, the collar, and the projection thereon, substantially as specified.

2. In a box-nailing machine, the combination, with the frame and the operating mechanism, of the gage K, the bolts $l$, having the bearing-heads, the hangers secured to the frame, the coiled springs surrounding said bolt, the adjusting thumb-screws, and means to act upon said bearing-heads, substantially as specified.

3. In combination with the gage K, the plate N at the lower edge of said gage, and the adjusting-screws, substantially as specified.

4. In a box-nailing machine, the combination, with the frame and the operating mechanism, of the transverse shaft having the step-cams thereon, the boxes $p$, the cross-head, the link pivoted to said cross-head at one end and at its other end to a bracket on the shaft, the pivoted dog, and the ratchet secured on said shaft, substantially as specified.

5. The combination, with the shaft O, of the adjustable step-cams T, the adjustable step-cam U, the gages projecting through the openings in the face plate of the machine, the roller $u$, journaled in the frame W, the bolt $w$, the spring thereon, and the set-bolt, substantially as specified.

6. In a box-nailing machine, the combination, with the frame, of the cross-bar A″, journaled in the frame, the arm-connection B′, the reciprocating cam-plates C′, provided, respectively, with a single and double cam-face, substantially as specified.

7. In a box-nailing machine, the combination, with the rod F′ and the driving-gear, of the feed-box having the stalls H′, the slot-openings $d'$, the shoulders $e$, the hinged front having the integral fingers projecting over a portion of the slots, the lugs $g'$, the trip, and the spring, substantially as specified.

8. In a box-nailing machine, the combination, with the nail feed-box, the reciprocating cams, and the driving mechanism, of the picker-bars having the yielding spring-pressed jaw and the lugs thereon, the slotted front plate, the pickers journaled on the bolts $j'$, and returning spring, substantially as specified.

9. The picker for box-nailing machine having the removable fixed jaw, the jaw having the threaded bolt $m'$, the adjusting-nut, the coiled spring, the slotted projection, and the thumb-screw projecting through said slot, substantially as specified.

10. The combination, with the picker having the curved head and the removable and the fixed jaws, of the slotted extension, the thumb-screw, and the internally-threaded lug, substantially as specified.

11. In a box-nailing machine, the chuck, consisting of the clutch-arms pivoted within the recess $b^2$ of the chuck-casing and having the adjacent grooved sides, the springs, and the grooved spring-controlled levers pivoted near their upper ends at opposite sides of the drivers, substantially as specified.

12. The chuck-casing having the removable side provided with a hinged portion and the pivoted keeper holding said hinged portion in its closed position, substantially as specified.

In testimony whereof I affix my signature in presence of two witnesses.

JEREMIAH CASEY.

Witnesses:
HUBERT E. PECK,
D. J. FOLEY.